United States Patent

Simon et al.

[11] Patent Number: 5,862,454
[45] Date of Patent: Jan. 19, 1999

[54] AUTOMATED RADIO CHECK SYSTEM AND METHOD

[75] Inventors: Gary B. Simon, Winchester, Mass.; David Wartofsky, Fort Washington, Md.

[73] Assignee: Potomac Aviation Technology Corp., Boston, Mass.

[21] Appl. No.: 508,998

[22] Filed: Jul. 28, 1995

Related U.S. Application Data

[60] Continuation-in-part of Ser. No. 411,583, Mar. 29, 1995, which is a division of Ser. No. 215,926, Mar. 22, 1994, Pat. No. 5,434,565.

[51] Int. Cl.⁶ .................................................. H04B 17/00
[52] U.S. Cl. ............................................ 455/67.1; 455/98
[58] Field of Search ................................ 455/54.1, 54.2, 455/67.1, 67.4, 67.7, 98, 58.1, 223, 524, 517, 527; 340/945, 947, 948, 949, 952, 502, 313, 968, 963, 905

[56] References Cited

U.S. PATENT DOCUMENTS

| | | | |
|---|---|---|---|
| 3,235,838 | 2/1966 | Hilt | 340/26 |
| 3,281,789 | 10/1966 | Willcox et al. | 340/152 |
| 3,373,405 | 3/1968 | Gadbois | 340/147 |
| 3,598,910 | 8/1971 | Johnston et al. | 178/6.6 |
| 3,699,443 | 10/1972 | Weger | 325/4 |
| 3,737,782 | 6/1973 | Pierce | 325/363 |
| 3,949,399 | 4/1976 | Huber et al. | 343/100 |
| 4,043,194 | 8/1977 | Tanner | 73/178 |
| 4,048,564 | 9/1977 | Gleeson, Jr. | 325/67 |
| 4,079,905 | 3/1978 | Greene | 244/191 |
| 4,093,937 | 6/1978 | Habinger | 340/26 |
| 4,162,449 | 7/1979 | Bouyssounouse et al. | 325/55 |
| 4,163,216 | 7/1979 | Arpino | 340/152 |
| 4,234,952 | 11/1980 | Gable et al. | 370/94 |
| 4,295,139 | 10/1981 | Arpino . | |
| 4,318,076 | 3/1982 | Whitfield | 340/27 NA |
| 4,354,275 | 10/1982 | Bouyssounouse et al. | 455/54 |
| 4,519,069 | 5/1985 | Pudsey | 370/85 |
| 4,635,285 | 1/1987 | Coombes | 379/63 |
| 4,744,083 | 5/1988 | O'Neill et al. | 371/22 |
| 4,777,656 | 10/1988 | Wade | 455/98 |
| 4,780,715 | 10/1988 | Kasugai | 340/825.08 |
| 4,788,543 | 11/1988 | Rubin | 340/825.44 |
| 4,839,645 | 6/1989 | Lill | 340/870.17 |
| 4,857,030 | 8/1989 | Rose | 446/303 |

(List continued on next page.)

FOREIGN PATENT DOCUMENTS

| | | | |
|---|---|---|---|
| 0 319 491 | 6/1989 | European Pat. Off. | G01W 1/00 |
| 2 654 536 | 5/1991 | France | G08G 5/00 |

OTHER PUBLICATIONS

F.A.A. Advisory Circular, "Automated Weather Observing Systems (AWOS) for Non–Federal Applications", AC No. 150/5220–16A, Jun. 12, 1990, pp. 1–51.

"The Automatic Terminal Advisory System" Marketing materials and system specification. Some dates given, no dates confirmed.

*Primary Examiner*—Reinhard J. Eisenzopf
*Assistant Examiner*—Marsha D. Banks-Harold
*Attorney, Agent, or Firm*—Hamilton, Brook, Smith & Reynolds, P.C.

[57] ABSTRACT

An automated transceiver is adapted to monitor a frequency of interest. In response to receiving some predetermined protocol, it becomes activated and records the next transmission on the frequency. The transceiver then rebroadcasts the recorded transmission. In this way, a radio operator can be assured that the transceiver is operating when the rebroadcasted transmission is received. If the transmission from the device is an acceptable quality, there is an assurance that the transceiver is operating properly since, to receive the rebroadcasted transmission, both the transmitter portion must operate to transmit the message to the inventive radio check device, and the receiver portion of the transmitter must be operational to receive the rebroadcasted message from the system. The remote operator need not rely on the subjective determination of another. Further, the participation of another person is not required.

14 Claims, 3 Drawing Sheets

U.S. PATENT DOCUMENTS

| | | | |
|---|---|---|---|
| 4,970,510 | 11/1990 | Stelling | 340/945 |
| 5,025,382 | 6/1991 | Artz | 364/439 |
| 5,105,191 | 4/1992 | Keedy | 340/968 |
| 5,210,611 | 5/1993 | Yee et al. | 358/191.1 |
| 5,265,024 | 11/1993 | Crabill et al. | 364/443 |
| 5,282,204 | 1/1994 | Shpancer et al. | 370/94.2 |
| 5,305,374 | 4/1994 | Snyder | 379/67 |
| 5,353,326 | 10/1994 | Jung | 379/6 |
| 5,396,651 | 3/1995 | Nitardy | 455/54.2 |

AUTOMATED RADIO CHECK SYSTEM AND METHOD

RELATED APPLICATIONS

This application is a continuation-in-part of U.S. patent application Ser. No. 08/411,583 filed on Mar. 29, 1995, which is a divisional application of U.S. patent application Ser. No. 08/215,926, filed Mar. 22, 1994, now U.S. Pat. No. 5,434,565 the contents of which are incorporated herein by reference in their entirety.

BACKGROUND OF THE INVENTION

The radio-frequency transceiver is ubiquitous and far ranging in the applications to which it is applied. Shortwave radios allow licensed operators to communicate across oceans and continents. Citizen band (CB) radios are generally less regulated but more common. Pilots rely on radio-frequency transceivers to communicate with air traffic controllers who coordinate the access to limited airspace. Marine vessels use the transceivers to request and receive weather information, or in the event of an emergency, request assistance from the coast guard or nearby ships. And, this merely represents a short list of the applications for these devices.

Common to every application of the radio frequency transceiver is the need for radio checks. Most radio-frequency transceivers do not provide any independent confirmation of the establishment of a radio link between two communicating parties. More simply, when operators transmit a request for information, for example, the only confirmation that this request is heard and intelligible is the response from another party. As a result, if the party receives no response from a given transmission, either of two events could have occurred: 1) no one in fact responded to the request, or 2) the transmitter and/or receiver portions of the transceiver are not operating properly. As a result, in order to exclude the second possibility, the operator periodically requests radio checks to ensure that the transceiver is fully operational. According to this process, a given operator will broadcast on the frequency and request that someone respond. Another party upon hearing this request will transmit back that the operator's request was received and give some indication of the strength of the received signal. Thus, the operator is assured that the transceiver is operating properly: 1) the transmitter portion effectively transmitted a signal since it was received by the other party, and 2) the receiver portion operates properly since the other party's transmission was received.

SUMMARY OF THE INVENTION

The typical process by which radio checks are performed has a number of drawbacks. First, it requires the participation of another party. In many cases, however, another party is either not available or unwilling to assist the operator in performing the radio check. Moreover, the operator must rely on the other party's good faith and subjective assessment of the signal strength. That is, a "strong signal" can mean different things to different people. Still further, it is rare that the exact location of the other party is precisely known by the operator since the other party may be in some moving vehicle. As a result, a strong signal indication from that other party may be meaningless if that other party is nearby. Or, in the alternative case, a weak signal indication may unduly cause alarm if the other party is extremely remote. As a result, the typical process is fraught with problems.

In view of these problems, the present invention is directed to a method and device for essentially automating the radio check procedure. An automated transceiver is adapted to monitor a frequency of interest. In response to receiving some predetermined protocol, it becomes activated and records the next transmission on the frequency. This allows the device to operate on shared frequencies used by other parties for independent communications. The transceiver then rebroadcasts the recorded transmission. In this way, a radio operator can be assured that the transceiver is operating when the rebroadcasted transmission is received. If the transmission from the device is an acceptable quality, there is an assurance that the transceiver is operating properly since, to receive the rebroadcasted transmission, both the transmitter portion must operate to transmit the message to the inventive radio check device, and the receiver portion of the transmitter must be operational to receive the rebroadcasted message from the system.

In specific embodiments, the radio check device is activated by "clicking" the transmit button of the operator's transceiver a predetermined number of times. This results in the repeated generation of an unmodulated carrier by the transceiver which the device detects. In other embodiments, voice recognition systems can be used so that the device is activated when the operator speaks the words "radio check", for example.

In general, according to another aspect, the invention also features an on-board system for a vehicle. Specifically, the radio-check system is located on the airplane, train or boat, for example. This independent system responds as described earlier so that the vehicle operator will have a dedicated system to ensure that the vehicle's main radio is operating properly. Here, however, a broadcasted activation protocol is not strictly necessary since activation can be accomplished by a vehicle control system.

In specific embodiments, the sensitivity of the radio check system can be manipulated to mimic radio transmission across some predefined distance. This ensures that the main radio is broadcasting with the required power.

The above and other features of the invention including various novel details of construction and combinations of parts, and other advantages, will now be more particularly described with reference to the accompanying drawings and pointed out in the claims. It will be understood that the particular method and device embodying the invention is shown by way of illustration and not as a limitation of the invention. The principles and features of this invention may be employed in various and numerous embodiments without the departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
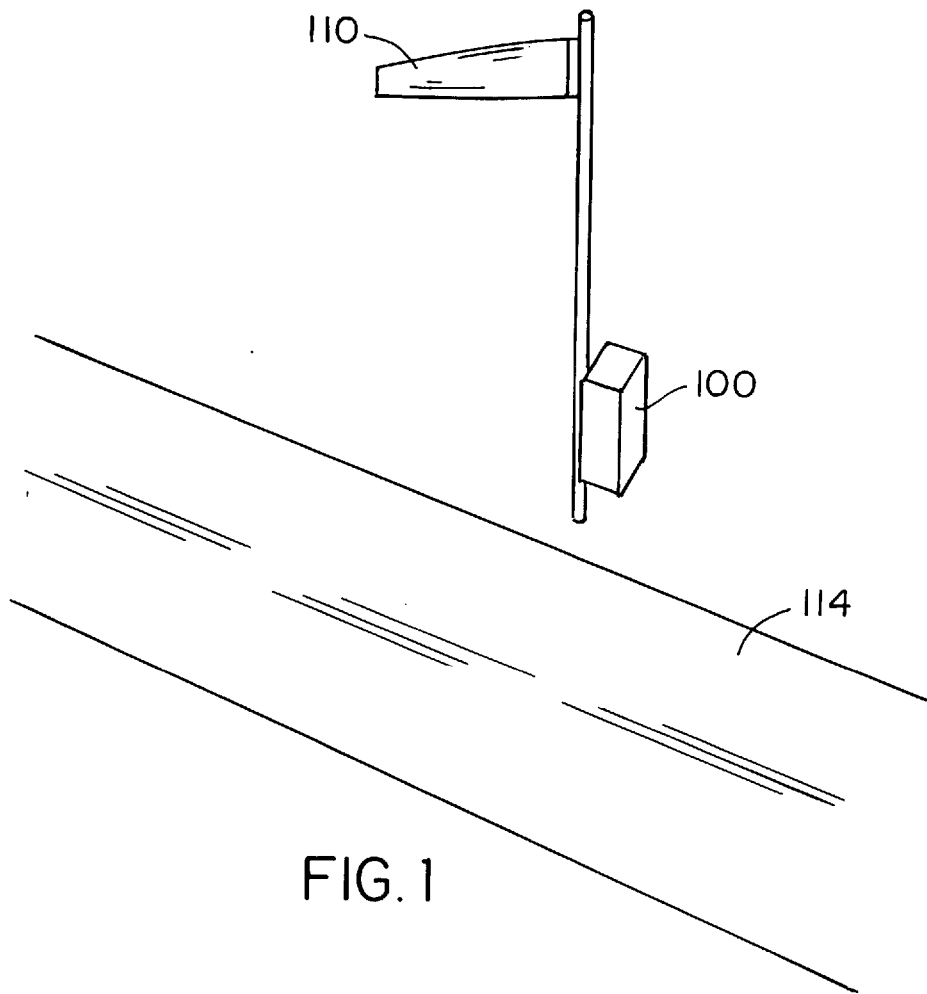
FIG. 1 is a perspective view of the automated radio check system installed at an air field.

FIG. 1 illustrates the radio check system 100 installed at a typical airfield 114. The windsock pole 110 is an ideal location because of its known location and the fact that it is typically located where buildings or other obstructions will not inhibit the operation of the system. The applications are not limited to aviation, however. For example, the radio check system 100 could be alternatively located at a harbor or on a buoy to provide radio checks to ships. The system could also be located at a police station near a highway to provide radio checks to motorists' CB radios. And, this represents only a short list of the venues for the system 100.

Figure 2:
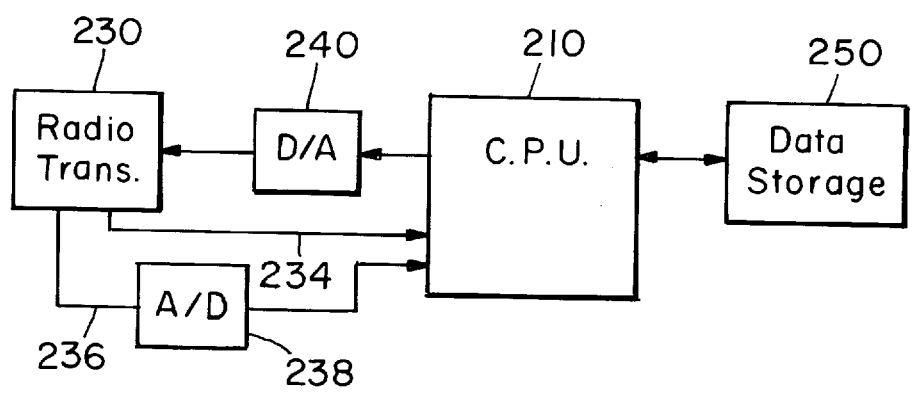
FIG. 2 is a block diagram of the inventive system.

FIG. 2 is a block diagram of the radio check system 100. A radio transceiver 230 is included that continuously monitors the radio frequency of interest. For aviation applications the frequency can be the common traffic advisory frequency (CTAF), for example. The transceiver 230 provides both a carrier-detect signal on line 234 and the demodulated baseband transmissions on the radio frequency on line 236. An analog to digital converter 238 digitizes the transmissions for a central processing unit (CPU) 210.

The CPU 210 is programmed to monitor the carrier detect signal 234 from the transceiver 230 and uses this signal to determine if the protocol for activating the radio check system has been transmitted from a radio operator, in one embodiment. In other embodiments, the CPU 210 monitors the digitized transmissions using a voice recognition algorithm to assess whether an activation protocol is spoken.

When the activation protocol is detected, the CPU 210 may first broadcast a message announcing activation of the automated radio check. The digitized message is provided to a transmitter portion of the transceiver 230 via digital to analog converter 240. After the announcement, the CPU 240 records any demodulated transmissions received via line 238 from the transceiver 230. The digitized transmission is specifically stored in data storage 250, which is accessible by the CPU 210. Then once the transmission from the remote radio operator is concluded, the CPU 210 regenerates the recorded message stored in storage 250 via the digital/analog converter 24 and provides it to the transceiver 230 which is controlled to transmit the message.

In other embodiments, rather than rebroadcasting the message, the C.P.U. could assess the strength of the original broadcast and then synthesize a message describing the message's strength.

Figure 3:
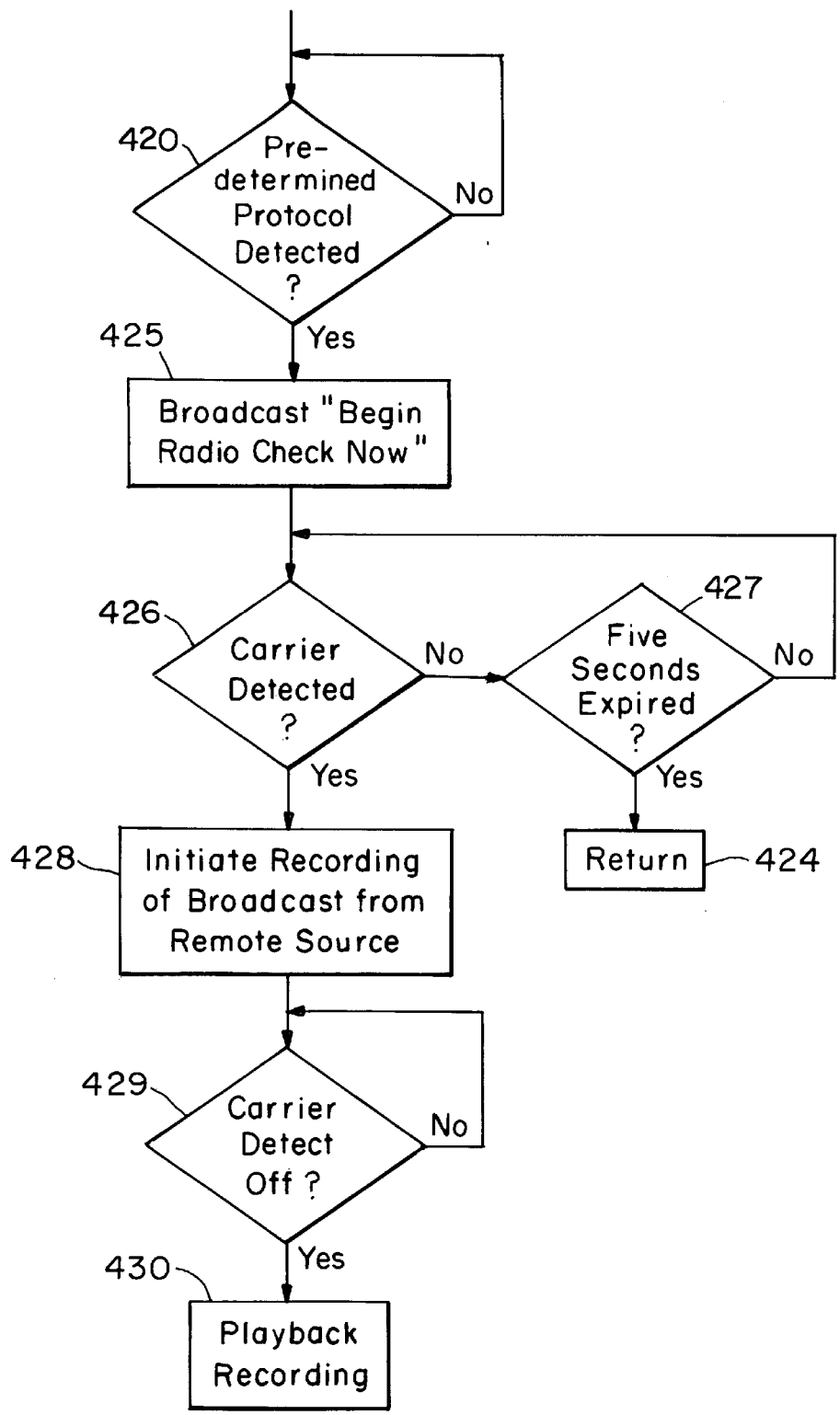
FIG. 3 is a flow diagram illustrating a method of operation of the inventive system.

FIG. 3 illustrates in more detail the preferred method of operation of the radio check system 100. Specifically, in step 420, the system 100 passively monitors transmissions on the frequency of interest for a predetermined protocol. In the simplest case, this protocol can be transmitted from a remote operator by repeatedly pressing the transmit button of the operator's transceiver a predetermined number of times, such as four, within some interval such as two seconds.

Alternatively, the inventive system can implement voice recognition technology. Specifically, in such an implementation, the CPU 210 would monitor all transmissions on the frequency of interest for a particular spoken phrase. For example, the phrase could be "radio check requested".

When the predetermined protocol is received and recognized by the system, in the preferred embodiment the system transmits a recorded message such as "request for radio check received, begin message now" as step 425. The system 100 then waits for a carrier signal step 426. If no signal is detected within 5 seconds, step 427, the system 100 stops the radio check procedure, step 424. Usually, however, the remote operator transmits some message from transceiver to be tested, such as "testing, 1, 2, 3 . . . ". The system records this message from the remote operator in step 428. The length of the messages that the system will record are typically 4–5 seconds.

The system then waits until the carrier detect signal indicates that the remote operator has finished the transmission in step 429. The system then plays back the recording and transmits this over the frequency of interest in step 430.

According to this operation the remote operator can confirm that the transceiver radio is operating by noting the quality of the broadcast from the system 100. As a result, the above-described invention yields the earlier listed advantages. First, the remote operator need not rely on the subjective determination of another. The operator receives the rebroadcasted recording of the original broadcast. A personal assessment of the quality of this broadcast can then be made. Secondly, the distance across which the signal has travelled is usually known, since the system is typically located at some common reference point such as a runway at an airfield or the coast guard station at a harbor, or a buoy in the ocean. Thirdly, since the system is entirely automated, the participation of another person is not required. Further, the present invention can also be incorporated with a weather monitoring station as described in U.S. Pat. No. 5,434,565 entitled "Automatic Weather Monitoring and Adaptive Transmitting System" by the same inventors. This patent is incorporated herein by this reference.

Figure 4:
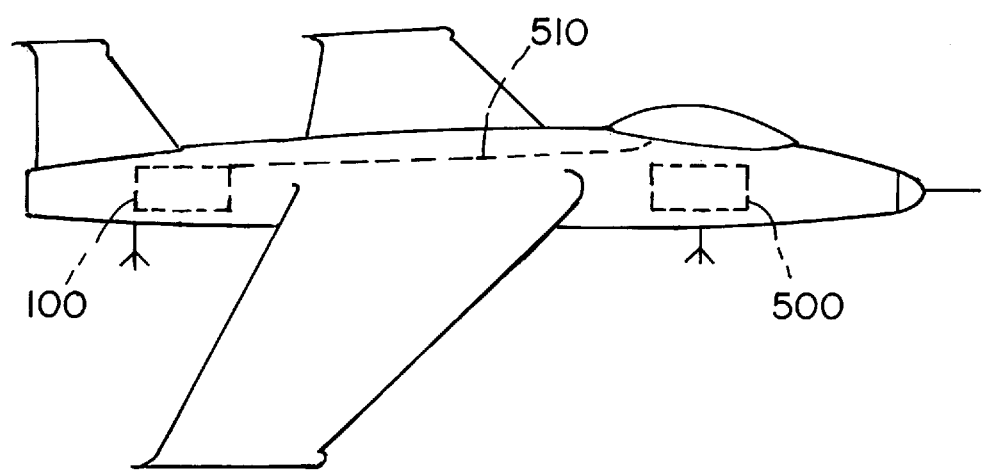
FIG. 4 is a schematic diagram showing the inventive system installed on the aircraft, or vehicle generally, according to the invention.

In many situations, the vehicle, be it an airplane or ocean-going vessel, may be too distant from a stationary radio check system to receive the radio check. In these situations, however, it is still helpful to confirm the proper operation of the vehicle's main radio. According to another embodiment, the radio check system 100 can be located on the vehicle itself as shown in FIG. 4. In the specific example shown, the system is located in the airplane's tail section. As described in reference to FIGS. 2 and 3, this system operates to record and rebroadcast the transmission from the main radio 500 of the airplane. Here, however, the system 100 can be activated or turned on by control signals transmitted on electric cabling 510 within the airplane. Further, it may operate on a dedicated frequency to respond to all transmissions when it is active. In any event, however, regardless of how the system is activated it, as described earlier, records and then rebroadcasts the transmissions from the airplane's main radio 500. As a result, the pilot can confirm that the main radio 500 is operational.

In this embodiment, it may be helpful to decrease the sensitivity of the radio check system 100 to mimic transmission of the main radio's signal across some distance. That is, if the main radio is operating properly except for the fact that its signal strength is unacceptably low, the present system might transmit back a signal that would appear to have the proper signal strength. To combat this problem, the inventive system can be tuned to respond to only transmissions from the main radio that have an acceptable strength. This can be accomplished by attenuating the transceiver's sensitivity or, for example, by shielding the antenna of the system with some radio frequency absorbing material.

While this invention has been particularly shown and described with references to preferred embodiments thereof, it will be understood by those skilled in the art that various changes in form and details may be made therein without departing from the spirit and scope of the invention as defined by the appended claims.

We claim:

1. An automated system for providing radio checks to radio operators, the system comprising:

a transceiver;

a controller for recording broadcasts received by the transceiver from radio operators in response to receiving a predetermined activation protocol from the radio operator, and then playing back the recording and rebroadcasting the broadcasts via the transceiver.

2. A system as described in claim 1, wherein the controller broadcasts an indication of the activation of the system in response to receiving the activation protocol.

3. A system as described in claim 1, wherein the controller initiates the recording of the broadcasts in response to detecting a carrier signal.

4. A system as described in claim 1, wherein the controller detects activation protocols comprising repeated unmodulated carrier signals.

5. A system as described in claim 1, wherein the controller detects activation protocols comprising verbal commands.

6. An automated radio check method for a radio transceiver system, the method comprising:

broadcasting a message indicating selection of an automated radio check in response to activating the system;

recording a broadcasted message; and playing back and broadcasting the recording.

7. A method as described in claim 6, further comprising activating the system in response to detecting a broadcast according to a predetermined protocol.

8. A method as described in claim 7, wherein protocol comprises repeated unmodulated carrier signals.

9. A method as described in claim 7, wherein the protocol comprises verbal commands.

10. A method as described in claim 6, further comprising delaying recording until detection of a carrier signal.

11. A method as described in claim 6, further comprising delaying playing back the recording until a carrier signal is no longer detected.

12. An automated system for providing radio checks for a main radio of a vehicle, the system comprising:

a transceiver installed in the vehicle;

a controller, installed in the vehicle, for recording broadcasts received by the main radio in response to being activated by a radio operator, and then playing back the recording and rebroadcasting the broadcast via the transceiver.

13. A system as described in claim 12, wherein a sensitivity of the transceiver is adjusted to ensure response only to signals from the main radio having acceptable signal strength.

14. A system as described in claim 12, wherein the controller initiates the recording of the broadcast in response to detecting a carrier signal.

* * * * *